United States Patent [19]
Cho et al.

[11] Patent Number: 5,191,422
[45] Date of Patent: Mar. 2, 1993

[54] CLAMP LEVEL SETTING METHOD FOR TELEVISION SIGNALS

[75] Inventors: Fujio Cho; Toshiyuki Shimizu, both of Tokyo; Yasuharu Ashida, Miyagi, all of Japan

[73] Assignee: NEC Corporation, Japan

[21] Appl. No.: 494,170

[22] Filed: Jul. 25, 1990

[30] Foreign Application Priority Data

Mar. 16, 1989 [JP] Japan .................................. 1-62167

[51] Int. Cl.[5] .......................... H04N 5/18; H04N 7/13
[52] U.S. Cl. ..................................... 358/172; 358/135
[58] Field of Search ............... 358/141, 171, 174, 172, 358/133, 135, 136; 341/200, 139, 155, 143

[56] References Cited

U.S. PATENT DOCUMENTS

| | | | |
|---|---|---|---|
| 3,818,127 | 6/1974 | Walter | 358/171 |
| 3,914,836 | 10/1975 | Mohri et al. | 358/176 |
| 4,124,869 | 11/1978 | Heitmann | 358/171 |
| 4,210,933 | 7/1980 | Heitmann | 358/172 |
| 4,785,356 | 11/1988 | Gonzales | 358/133 |
| 4,827,191 | 5/1989 | Chapman | 358/174 |
| 4,885,636 | 12/1989 | Sullivan | 358/133 |
| 4,910,586 | 3/1990 | Sharpe | 358/133 |

Primary Examiner—Victor R. Kostak
Attorney, Agent, or Firm—Ostrolenk, Faber Gerb & Soffen

[57] ABSTRACT

A method for setting the clamp level of a television signal in which the signal is converted by an A/D converter and quantized with a plurality of quantizers, comprises taking into account the quantization characteristics of the various quantizers in addition to the dynamic range of the A/D converter. The television signal is level shifted so that it is within the dynamic range of the A/D converter and is clamped to a level which minimizes the quantization error of that quantizer which has the largest quantization step size of all the quantizers.

11 Claims, 5 Drawing Sheets

COLOR BURST SIGNAL
PEDESTAL LEVEL
SYNC TIP LEVEL

FIG. 6.

| QUANTIZING CIRCUIT | QUANTIZATION VALUES |
|---|---|
| 1ST QUANTIZING 306 | 0,1,2,3,4,5,.....,252,253,254,255 |
| 2ND QUANTIZING 307 | 0,2,4,6,8,10,.....,248,250,252,254 |
| 3RD QUANTIZING 308 | 0,4,8,12,16,.....,240,244,248,252 |

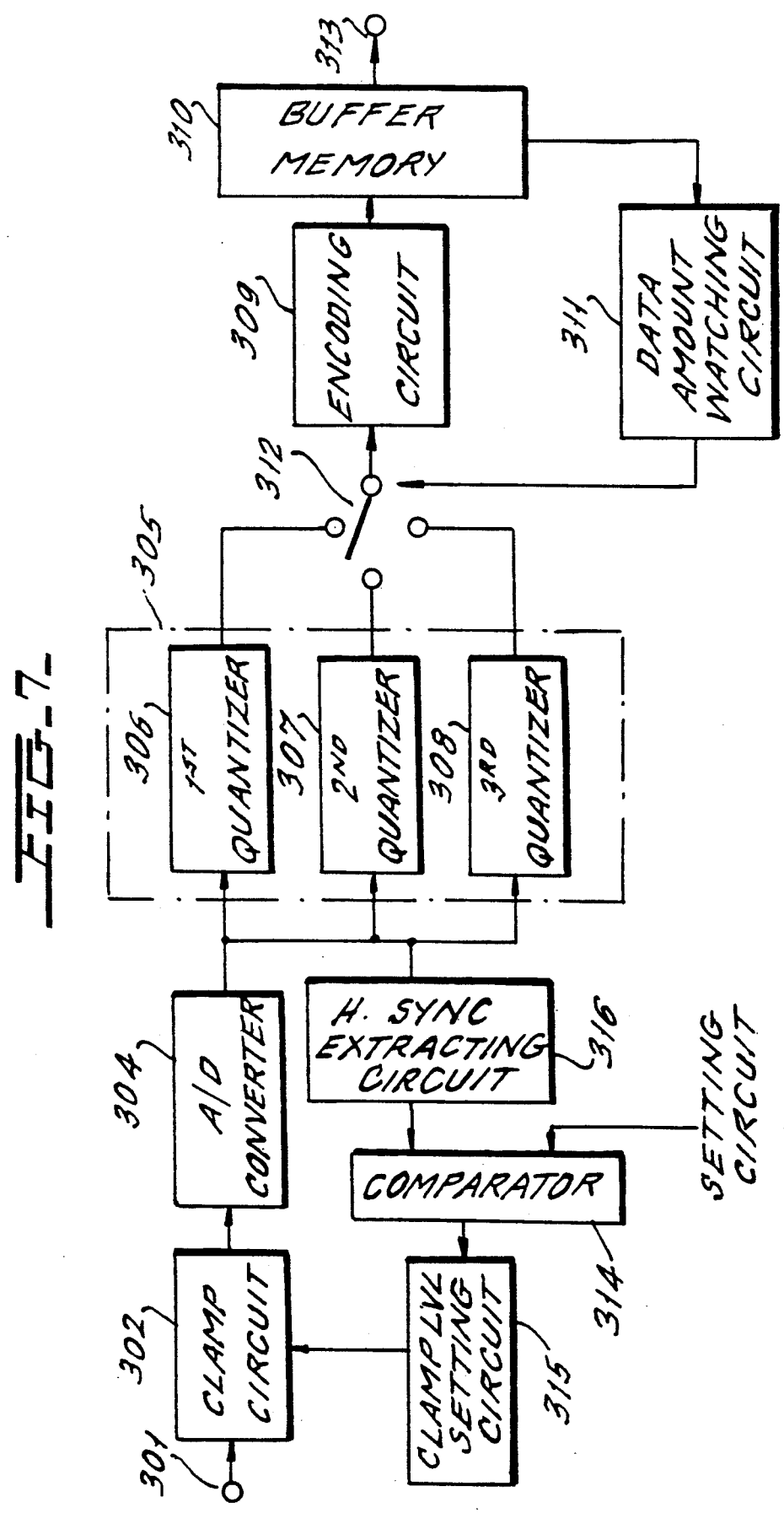

CLAMP LEVEL SETTING METHOD FOR TELEVISION SIGNALS

BACKGROUND OF THE INVENTION

The present invention relates to a television signal encoder and more particularly, to a clamp level setting method for TV signals appropriate for a TV signal encoder having a plurality of quantizers.

In a TV signal encoder, an analog TV signal is converted into a digitized TV signal by means of an A/D converter. The digitized TV signal then undergoes highly efficient encoding, such as a differential pulse code modulation (DPCM). Since an A/D converter generally has a predetermined dynamic range, the level of the TV signal is limited or clamped to a predetermined level prior to the A/D conversion. The clamping is performed by adding a DC offset to the analog TV signal, so that the fixed level of the TV signal, such as a sync tip level (the level at the start of a synchronization signal) or pedestal level (black level), assumes a predetermined level (clamp level). Conventionally, the clamp level is chosen to place the entire TV signal within the dynamic range of an A/D converter. On the other hand, several kinds of TV signal encoders have been developed, and one of them is a TV signal encoder which comprises a plurality of quantizers each having a different quantizing characteristic. By selectively switching the quantizers, coded information to be generated by the encoder is controlled. As more precisely described later, if the conventional clamp level setting method is applied to that TV signal encoder, the sync tip level, for example, may be quantized to another quantizing level which is different from the original level to which the sync tip level is quantized. The error thus caused by the quantizer appears on a display, such as television monitor, in the form of uneven brightness. This is due to the fact that the display utilizes the sync tip level as a reference for the display's brightness.

SUMMARY OF THE INVENTION

It is an object of the present invention to provide a clamp level setting method, which is free from the aforementioned defects, and by which an even brightness on the television monitor can be attained regardless of which one of the quantizers, each of which has a different quantizing characteristic, is used.

According to the present invention, there is provided a clamp level setting method for clamping a level of a predetermined position in a television signal to a predetermined clamp level. The method being suitable for a television signal encoder having an analog to digital converter and a plurality of quantizers, wherein the predetermined clamp level is set to a level such that the television signal is within the dynamic range of the A/D converter and a quantization error by a quantizer having the largest quantization step size among the plurality of quantizer is minimized.

BRIEF DESCRIPTION OF THE DRAWINGS

The above and other objects, features and advantages of the present invention will become apparent from the following detailed description when taken with the accompanying drawings, in which:

FIG. 6 is a table showing an example of the quantization levels of the quantizers; and FIG. 7 is a block diagram showing an example of the TV signal encoder according to the present invention.

DETAILED DESCRIPTION OF THE PREFERRED EMBODIMENT

Before going into the details of the present invention, it is appropriate to describe the conventional clamp level setting method.

Figure 1:
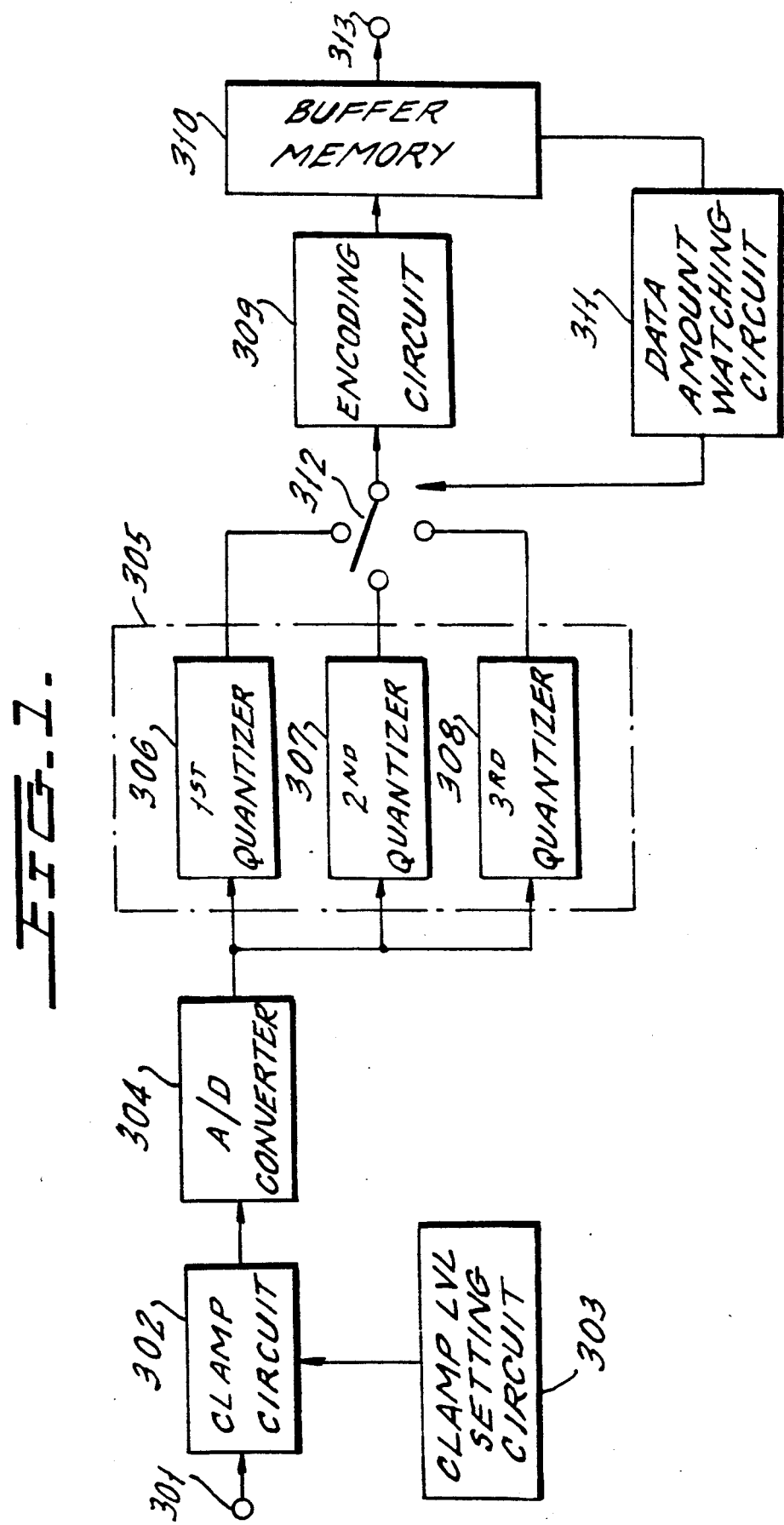
FIG. 1 is a block diagram showing an example of the TV signal encoder comprising a plurality of quantizers.

FIG. 1 is a block diagram of a typical TV signal encoder comprising a plurality of quantizers, each having a different quantization characteristic. In the encoder of this type, a TV signal is applied to a clamp circuit 302 through an input terminal 301. The clamp circuit 302 clamps a level of a certain position in the TV signal, such as sync tip level, to a predetermined level, and the clamped TV signal is applied to an A/D converter 304. The A/D converter converts the clamped TV signal into a digitized TV signal and supplies it to a quantizing circuit 305. The quantizing circuit 305 comprises first, second and third quantizers 306, 307 and 308, each having the different quantization characteristic. The quantizers can be realized by, for example, a ROM (read only memory). Each quantizer quantizes simultaneously the digitized TV signal from A/D converter 304, and then outputs a quantized TV signal. A switch 312 is responsive to a selection signal to select one of the quantized TV signals from the quantizer 306 to 308. An encoding circuit 309 encodes the selected quantized television signal using a highly efficient coding scheme, such as prediction coding. The encoding circuit further converts the coded signal into a variable length code, such as the Huffman code. A buffer memory 310 temporarily stores the variable length codes to adjust the coded data rate to the transmission rate. A data amount watching circuit 311 monitors the buffer memory occupancy and generates a selection signal in response to the buffer memory occupancy.

Figure 2:
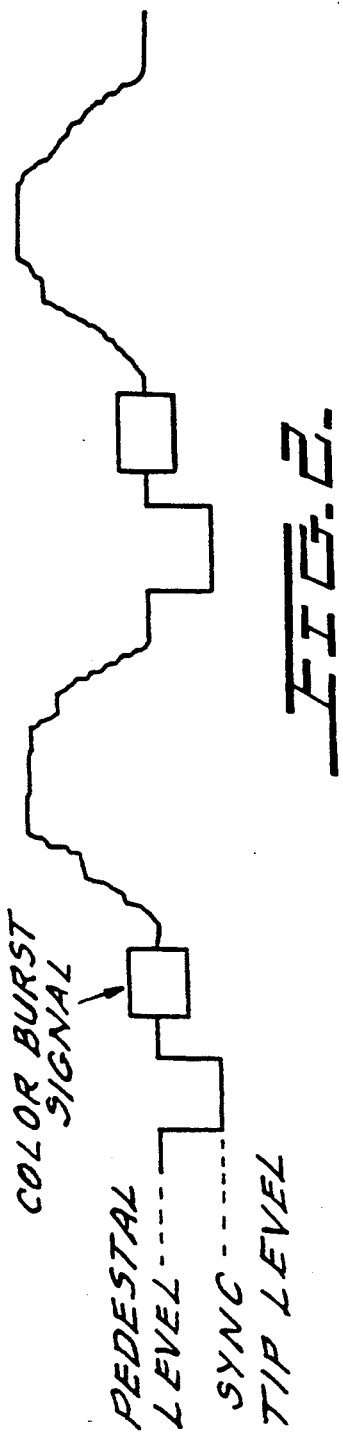
FIG. 2 is a diagram showing an example of the waveform of TV signal.

FIG. 2 shows a waveform of a TV signal, in which a rectangular portion after the sync pulse represents the color burst signal. Now, it is assumed that the dynamic range of the input TV signal is 1 $V_{p-p}$ (peak to peak) and that the sync tip level is $-0.2$ V. Moreover, the dynamic range of the A/D converter 304 (FIG. 1) is assumed to be from 0 V to 1.4 V.

Figure 3B:
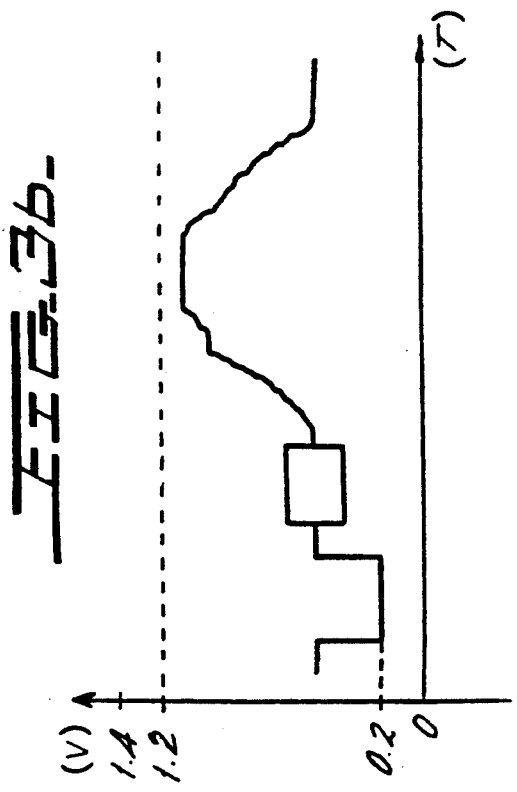
FIGS. 3a and 3b are diagrams for explaining the clamp operation.
Figure 3A:
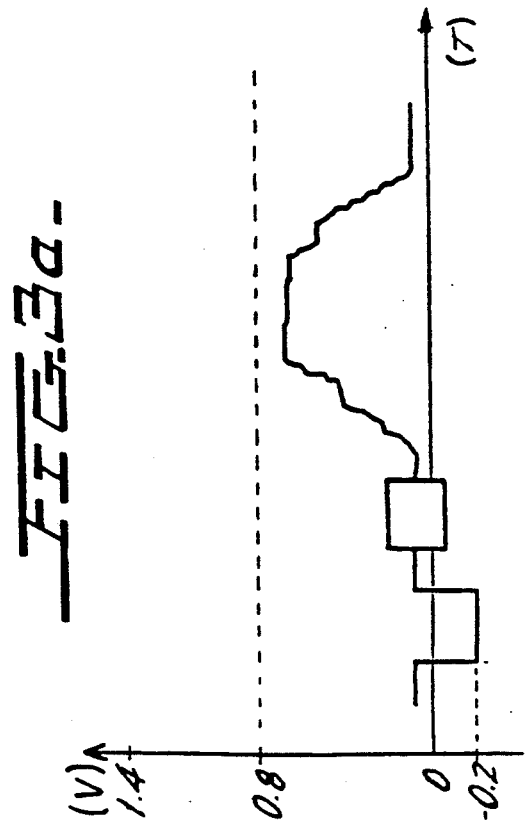

The conventional clamp level setting under these conditions will be explained with reference to FIGS. 3a and 3b. FIG. 3a shows a TV signal before it has been changed where the sync tip level of the TV signal is out of the dynamic range of the A/D converter. Therefore, the sync tip level should be clamped at a predetermined level, so that it falls within the dynamic range of A/D converter. FIG. 3b shows a TV signal clamped at the appropriate level.

The conventional clamp level setting considers only the dynamic range of A/D converter. Therefore, when the conventional method is applied to the encoder having a plurality of quantizers, the same level of the TV signal may erroneously be quantized to the different quantization level with a relatively large quantization error.

Figure 4A:
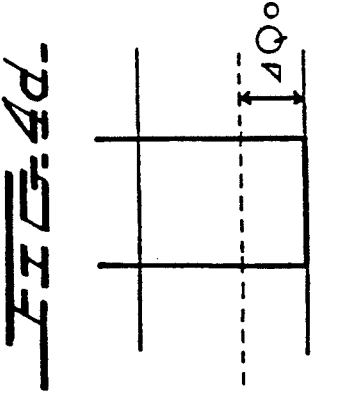
FIGS. 4a to 4d are diagrams for explaining the conventional clamp level setting method.
Figure 4B:
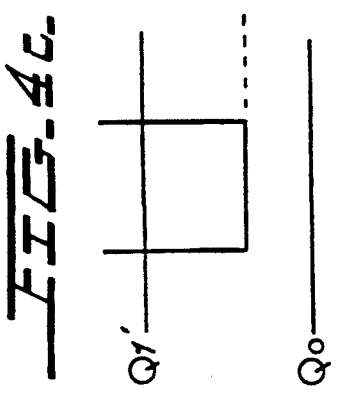
Figure 4C:
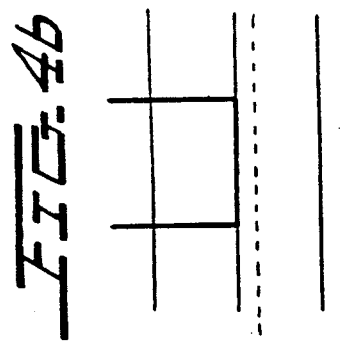
Figure 4D:
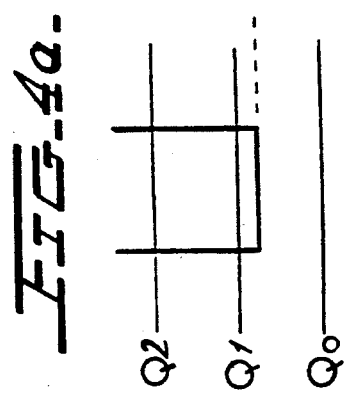

Referring to FIGS. 4a to 4d, the problem will be described in more detail. In these figures, the sync portion of TV signal is quantized by two quantizers whose quantization step sizes are 2:1 and whose threshold values of quantization are selected to be the middle of the quantization levels. In FIGS. 4a and 4b, the sync tip level is quantized to the quantization level Q1 with a quantization error $\Delta Q1$, while in FIGS. 4c and 4d it is quantized to the level Q0 with an error $\Delta Q0$. The quantization error $\Delta Q0$ which is greater than $\Delta Q1$ brings about the uneven brightness on the monitor screen of the display, as described above.

Now, the present invention will be explained. The feature of the clamp level setting method of the present invention lies in considering the quantization characteristics of the quantizers in addition to the dynamic range of A/D converter. In other words, under the condition that the TV signal is within the dynamic range of A/D converter, the TV signal is clamped to a level to minimize the quantization error of the quantizer having the largest quantization step size among the quantizers. Ideally, the quantization error is zero, when the clamp level is determined to be the quantization level itself. For example, it is assumed that the quantizers 306 to 308 have the quantization characteristics as shown in FIG. 6. This means that the quantizers 306 to 308 correspond to 8, 7 and 6 bits quantizing circuits, respectively. All of the quantization levels of the quantizer 308 which have the largest quantization step size are included in the quantization levels of the remaining quantizers 306 and 307. Namely, if the clamp level is set to the quantization level of the quantizer 308, the clamped sync tip level is exactly quantized with no quantization error even if any one of the quantizers 306 to 308 is selected.

Figures 5A, 5B, 5C:
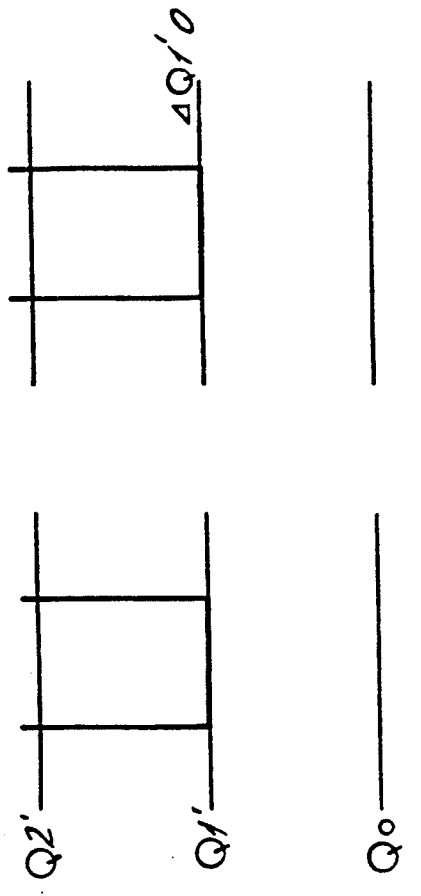
FIGS. 5a to 5d are diagrams for explaining the advantages of the present invention.
Figure 5D:
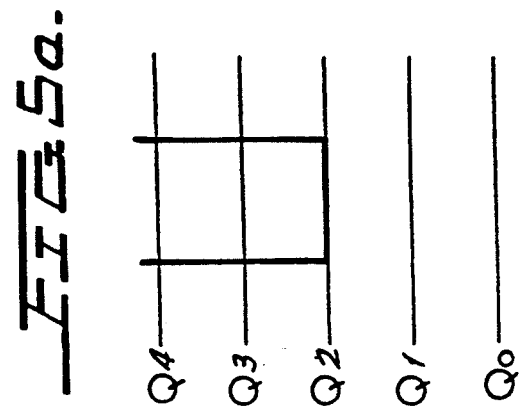

FIGS. 5a to 5d are the diagrams for explaining the clamp level setting method of the present invention. In these figures, the quantization step size of one of the quantizers is twice as large as the other. If the clamp level is set to a quantization level, say Q1', as shown in FIG. 5c, the quantization error $\Delta Q1'$ is equal to zero. Since the quantization level Q1' in FIGS. 5c and 5d corresponds to a quantization level Q2 in FIGS. 5a and 5d, the quantization error $\Delta Q2$ is equal to zero. Consequently, even if quantizers having different quantization characteristic are used, the sync tip level, is quantized to the same level with no quantization error.

In practice, the clamp level setting in the TV signal encoder in FIG. 1 is performed by monitoring the horizontal sync portion of the A/D converter output and by adjusting, for example, a variable resistor in the clamp level setting circuit 303 so that the sync tip level assumes a predetermined level. Although this method provides clamp level setting to a certain precision, the level shift due to the ambient temperature variation and aging is inevitable.

FIG. 7 is a block diagram showing a TV signal encoder comprising a horizontal sync extracting circuit 316 and a comparator 314. The horizontal sync extracting circuit 316 extracts the horizontal sync portion of the digitized TV signal from an A/D converter 304 and applies it to the comparator 314. The extracted digitized value of sync tip level is compared with the clamp level by means of the comparator 314. The comparator 314 supplies the compared result to the clamp level setting circuit 315 as a compensation control signal. In response to the compensation control signal, the clamp level setting circuit 315 controls the clamp circuit 302. Thus, by constituting a feedback loop composed of the horizontal sync extracting circuit 316, comparator 314 and clamp level setting circuit 315, the more accurate clamp level setting is obtained. The detail of the clamp level control by means of the feedback loop are described in U.S. Pat. No. 4,742,392, for example, the contents of which patent are incorporated herein by reference.

As described above, according to the clamp level setting method of the present invention, stable encoding of the clamp level is possible in the TV signal encoder comprising a plurality of quantizers having different quantization characteristics. Consequently, the problem of uneven brightness on the monitor screen can be ameliorated.

Although the sync tip level is used as a target of the clamp operation in the present embodiment, it is obvious that this method can be applied to the clamp level setting for the pedestal level, because the difference between the pedestal level and sync tip level is constant.

Moreover, the present embodiment has been explained for the case where the relation between the quantization levels of the plural quantizers is, as is shown in FIG. 6, such that all the quantization levels of the quantizer having the larger quantization step size are included in the quantization levels of the quantizer having the smaller quantization step size. However, either for the case where the above relation is not fulfilled, or for the case where the clamp level can not be chosen to the quantization value of the quantizer having the largest quantization step size, it is obvious that the problem of uneven brightness on the monitor screen can be ameliorated by employing the clamp level setting method of the present invention.

What is claimed is:

1. A method for setting a clamp level of a predetermined portion of a television signal to a predetermined clamp level, wherein the television signal is processed by an analog to digital converter and a plurality of quantizers, the method comprising the steps of: setting said predetermined clamp level to a level such that said television signal is within the dynamic range of said analog to digital converter and such that a quantization error associated with a given quantizer of said quantizers which has the largest quantization step size of said plurality of quantizers is minimized.

2. A clamp level setting method of claim 1, wherein said predetermined portion of said television signal is the sync tip level.

3. A clamp level setting method of claim 1, wherein said predetermined portion of said television signal is the pedestal level.

4. A television signal encoder, comprising:
   clamp circuit means for receiving an input television signal and for clamping a predetermined portion of said input television signal to a predetermined clamp level;
   A/D converter means for converting the television signal from said clamp circuit means into a digitized television signal;
   quantizing circuit means including a plurality of quantizer means having different quantizing characteristics, for quantizing said digitized television signal to produce quantized television signals;
   selection means for selecting one of said quantized television signals as a selected quantized television signal in response to a selection signal;

encoding circuit means for encoding said selected quantized television signal according to a predetermined encoding scheme to generate an encoded television signal;

buffer memory means for temporarily storing said encoded television signal;

monitor circuit means for generating said selection signal in response to the data amount of said encoded television signal stored in said buffer memory means;

wherein said predetermined clamp level is set to a level such that said input television signal is within the dynamic range of said A/D converter means and such that a quantization error associated with a given one of said quantizer means having the largest quantization step size of said plurality of quantizer means is minimized.

5. The television signal encoder of claim 4, wherein said predetermined portion of said input television signal comprises the sync tip level of said input television signal.

6. The television signal encoder of claim 4, wherein said predetermined portion comprises the pedestal level portion of said input television signal.

7. A television signal encoder, comprising:

clamp circuit means for receiving an input television signal and for clamping a predetermined portion of said input television signal to a predetermined clamp level;

A/D converter means for converting the television signal from said clamp circuit means into a digitized television signal;

quantizing circuit means including a plurality of quantizer means having different quantizing characteristics, for quantizing said digitized television signal to produce quantized television signals; and said clamp circuit means being effective to set said predetermined portion to a level such that said input signal remains in the dynamic range of said A/D converter means and such that a quantization error associated with a given one of said quantizer means which has a largest quantization step size is minimized.

8. The television signal encoder of claim 7, further comprising selection means for selecting one of said quantized television signals as a selected quantized television signal in response to a selection signal.

9. The television signal encoder of claim 8, further comprising encoding circuit means for encoding said selected quantized television signal according to a predetermining encoding scheme to generate an encoded television signal.

10. The television signal encoder of claim 9, further comprising buffer memory means for temporarily storing said encoded television signal.

11. The television signal encoder of claim 10, further comprising monitor circuit means for generating said selection signal in response to the amount of data associated with said encoded television signal and storing the same in said buffer memory means.

* * * * *